United States Patent

Omori

(10) Patent No.: US 10,440,981 B2
(45) Date of Patent: Oct. 15, 2019

(54) OIL/FAT COMPOSITION FOR SOLID ROUX

(71) Applicant: FUJI OIL HOLDINGS INC., Osaka (JP)

(72) Inventor: Hitomi Omori, Tsukubamirai (JP)

(73) Assignee: FUJI OIL HOLDINGS INC., Osaka (JP)

( * ) Notice: Subject to any disclaimer, the term of this patent is extended or adjusted under 35 U.S.C. 154(b) by 149 days.

(21) Appl. No.: 15/556,104

(22) PCT Filed: Feb. 25, 2016

(86) PCT No.: PCT/JP2016/055560
§ 371 (c)(1),
(2) Date: Sep. 6, 2017

(87) PCT Pub. No.: WO2016/143530
PCT Pub. Date: Sep. 15, 2016

(65) Prior Publication Data
US 2018/0020706 A1 Jan. 25, 2018

(30) Foreign Application Priority Data

Mar. 11, 2015 (JP) ................................ 2015-047841

(51) Int. Cl.
| | |
|---|---|
| A23L 23/10 | (2016.01) |
| A23D 9/00 | (2006.01) |
| A23D 9/04 | (2006.01) |
| C11C 3/10 | (2006.01) |

(52) U.S. Cl.
CPC ............... *A23L 23/10* (2016.08); *A23D 9/00* (2013.01); *A23D 9/04* (2013.01); *C11C 3/10* (2013.01); *A23V 2002/00* (2013.01); *A23V 2250/1942* (2013.01)

(58) Field of Classification Search
CPC .. A23L 23/10; A23D 9/00; A23D 9/04; A23V 2002/00; A23V 2250/1942
See application file for complete search history.

(56) References Cited

U.S. PATENT DOCUMENTS

| | | | | |
|---|---|---|---|---|
| 3,674,267 A | * | 7/1972 | Hollis .................. | A63B 49/035 473/299 |
| 4,199,611 A | * | 4/1980 | Toyoshima ............. | A23D 9/00 426/607 |
| 5,424,090 A | * | 6/1995 | Okawauchi .............. | A23G 1/36 426/607 |
| 7,645,473 B2 | | 1/2010 | Herzing et al. | |
| 2006/0105090 A1 | * | 5/2006 | Cain ........................ | A23D 9/00 426/601 |
| 2007/0286940 A1 | | 12/2007 | Herzing et al. | |
| 2008/0206425 A1 | * | 8/2008 | Dilley .................... | A23G 9/327 426/565 |
| 2010/0215809 A1 | * | 8/2010 | 'tZand .................... | A23D 9/00 426/94 |
| 2016/0066594 A1 | | 3/2016 | Motoike et al. | |

FOREIGN PATENT DOCUMENTS

| | | |
|---|---|---|
| JP | 2009-81999 | 4/2009 |
| JP | 2010-200654 | 9/2010 |
| JP | 2012-55179 | 3/2012 |
| JP | 2014-212720 | 11/2014 |
| WO | 2007/144132 | 12/2007 |
| WO | 2013/133138 | 9/2013 |
| WO | 2014/148388 | 9/2014 |

OTHER PUBLICATIONS

Rodrigues et al., "Chemical interesterification of milkfat and milkfat-corn oil blends", Food Research International, 36:149-159 (2003).
List et al., "Margarine and Shortening Oils by Interesterification of Liquid and Trisaturated Triglycerides", JAOCS, 72(3):379-382 (1995).
International Search Report dated May 31, 2016 in International (PCT) Application No. PCT/JP2016/055560.
International Preliminary Report on Patentability dated Sep. 12, 2017 in International (PCT) Application No. PCT/JP2016/055560.

* cited by examiner

*Primary Examiner* — Cephia D Toomer
(74) *Attorney, Agent, or Firm* — Wenderoth, Lind & Ponack, L.L.P.

(57) ABSTRACT

The objective of the present invention is to provide an oil/fat composition for a solid roux, said composition making it possible to achieve the physical properties required of a solid roux, i.e. shape retention during summertime, resistance to seepage of a liquid oil component, resistance to surface whitening, and good melt-in-the mouth properties, as well as a reduction in trans-fatty acid and saturated fatty acid content. Provided is an oil/fat composition for a solid roux, said composition being characterized in that the composition has a triglyceride composition comprising 15-40 wt % of an S3 triglyceride, 10-30 wt % of an S2U triglyceride, 10-25 wt % of an SU2 triglyceride, and 30-50 wt % of a U3 triglyceride (S: a C16-24 saturated fatty acid, U: a C16-18 unsaturated fatty acid), the weight ratio between C16 (P: palmitic acid) and C18 (St: stearic acid) is $0.5 \leq P/St \leq 2.0$, and SSU/SUS>1.

16 Claims, No Drawings

OIL/FAT COMPOSITION FOR SOLID ROUX

TECHNICAL FIELD

The present invention relates to a fat composition for solid roux for producing a solid roux such as curry roux, hash roux, and stew roux. Especially, the present invention relates to a fat composition for solid roux containing low amount of saturated fatty acid and trans fatty acid.

BACKGROUND ART

A solid roux, which is generally used for cooking curry, hash, stew, and the like, is made by mixing and heating flour, edible fat, seasoning, and the like, followed by cooling to solidify.

An appropriate heat-resistant and shape-retaining property in a distribution process and good de-molding property in a production process of a solid roux are required for the above-described edible fat. Thus, solid fat which is comparatively hard and has high melting point, such as hydrogenated oil made from lard or beef tallow, or mixed oil thereof, or hydrogenated oil or interesterified oil made from vegetable fat such as palm oil, or mixed oil thereof, has been used as the edible fat.

That is, physical properties required for the solid fat for the solid roux include that: a shape-retaining property is kept even in summer; a liquid oil component does not seep; a phenomenon that a surface of the solid roux whitens like a fungus is less likely to occur during storage; and a good de-molding property after cooling and solidifying in the production of the solid roux.

The following inventions have been disclosed for a fat for solid roux that fulfills the above-described required physical properties.

Patent Document 1 discloses a fat composition for solid roux, which is good in shape-retaining property, melting property, and texture, having low trans fatty acid content in the fat, and showing good de-molding property and little cracking in the production of the roux. This fat composition consists of 90 to 98% by mass of mixed oil of 50 to 90 parts by mass of beef tallow or lard and 10 to 50 parts by mass of fully hydrogenated beef tallow or fully hydrogenated lard, and 2 to 10% by mass of high erucic fully hydrogenated oil. And the fat composition shows more excellent shape-retaining property, melting property, and texture compared with a conventional partially hydrogenated beef tallow or partially hydrogenated lard.

Patent Document 2 relates to an edible processed fat and a food product which are hard to get soft even in summer, hard to solidify even in a refrigerator and excellent in shape retention and foam stability. The edible processed fat includes polyhydric alcohol fatty acid ester containing behenic acid as main constituent fatty acid. The edible processed fat is added into a food product such as curry roux to ensure a food product that is hard to get soft even in summer, hard to solidify even in the refrigerator, and excellent in the shape-retaining property and the foam stability.

PRIOR ART DOCUMENTS

Patent Documents

Patent Document 1: JP 2009-81999 A
Patent Document 2: JP 2010-200654 A

SUMMARY OF INVENTION

Problems to be Solved by Invention

The method of Patent Document 1 provides more excellent shape-retaining property, melting property, and texture compared with the conventional partially hydrogenated beef tallow or partially hydrogenated lard. However, the fat composition remains as unmelted residue during cooking, or solidifies during eating, and thus it shows poor melting speed in the mouth because a content of fully hydrogenated oil is relatively high. It also has problem that a saturated fatty acid content derived from the fully hydrogenated oil is slightly high while the trans fatty acid content is reduced.

Patent Document 2 is a method that can significantly reduce both contents of trans fatty acid and saturated fatty acid because the shape-retaining property is added by an emulsifier having relatively high melting point. However, when the processed fat is added into the solid roux, the liquid oil component severely seeps from the surface of the solid roux during the distribution in summer, and there is a problem that the liquid oil component adheres to a wrapping paper of the solid roux. Accordingly, this method is difficult to be used for the solid roux.

Recently, it is shown that a risk of developing heart disease increases by ingesting trans fatty acid and saturated fatty acid. Thus, it is preferred to reduce the contents of trans fatty acid and saturated fatty acid in fat. However, as described above, it is difficult to achieve the solid roux that ensures the reduction of the contents of trans fatty acid and saturated fatty acid, in addition to the shape-retaining property in summer, the resistance against seeping of the liquid oil component, the resistance against whitening of the surface, and the good melting speed in the mouth.

An object of the present invention is to provide a fat composition for solid roux that enables to provide shape-retaining property in summer, resistance against seeping of liquid oil component, resistance against whitening of the surface, and good melting speed in the mouth, which are physical properties required for the solid roux, and reduction of contents of trans fatty acid and saturated fatty acid at the same time.

Means for Solving the Problems

The present inventor has extensively studied for the above described problem. As a result, the inventor has found that a fat composition for a solid roux having a triglyceride composition including 15 to 40% by weight of S3 triglyceride, 10 to 30% by weight of S2U triglyceride, 10 to 25% by weight of SU2 triglyceride, and 30 to 50% by weight of U3 triglyceride, and having 0.5≤P/St≤2.0 weight ratio of C16 (palmitic acid) to C18 (stearic acid), and SSU/SUS>1, enables to efficiently provide both hardness and good melting speed in the mouth to an oily food, and enables to reduce saturated fatty acid content and trans fatty acid content in the final product. The present invention has been completed based on the findings.

That is, the present invention is:

(1) a fat composition for a solid roux having a triglyceride composition including 15 to 40% by weight of S3 triglyceride, 10 to 30% by weight of S2U triglyceride, 10 to 25% by weight of SU2 triglyceride, and 30 to 50% by weight of U3 triglyceride (S: saturated fatty acid having 16 to 24 carbon atoms, U: unsaturated fatty acid having 16 to 18 carbon atoms), and having 0.5≤P/St≤2.0 of weight ratio of C16 (P: palmitic acid) to C18 (St: stearic acid), and SSU/SUS>1;

(2) The fat composition for a solid roux of (1), having a triglyceride composition including 15 to 30% by weight of S3 triglyceride, 15 to 25% by weight of S2U triglyceride, 13 to 20% by weight of SU2 triglyceride, and 35 to 45% by weight of U3 triglyceride;

(3) The fat composition for a solid roux of (1) or (2), including less than 50% by weight of saturated fatty acid;

(4) The fat composition for a solid roux of any of (1) to (3), including less than 5% by weight of trans fatty acid in all constituent fatty acids;

(5) A solid roux including the fat composition for a solid roux of any of (1) to (4); and (6) A processed food including the solid roux of (5).

Effects of Invention

The present invention enables to produce a solid roux that shows shape-retaining property in summer, resistance against seeping of a liquid oil component, resistance against whitening of the surface, and good melting speed in the mouth, as well as reduced content of trans fatty acid and saturated fatty acid.

MODE FOR CARRYING OUT THE INVENTION

The present invention will be described in detail in the following.

A solid roux of the present invention has a solid shape at ordinary temperature, and is used for cooking curry, hash, stew, and the like, and is widely used for household use and for professional use, for example, in restaurants and feeding services because of its convenience in cooking.

The fat composition for a solid roux of the present invention is prepared from edible vegetable oil, fractionated oil thereof, fully hydrogenated oil thereof, oil obtained by subjecting mixed oil thereof to random-interesterification reaction, fractionated oil of random-interesterified oil, or mixed oil thereof. The above random-interesterified oil may be obtained by using alkaline catalyst such as sodium methylate, or enzyme catalyst such as lipase. The above fractionated oil may be obtained by a known method such as solvent fractionation and dry fractionation.

The fat composition for a solid roux of the present invention has a triglyceride composition including 15 to 40% by weight, preferably 15 to 30% by weight of S3 triglyceride, 10 to 30% by weight, preferably 15 to 25% by weight of S2U triglyceride, 10 to 25% by weight, preferably 13 to 20% by weight of SU2 triglyceride, and 30 to 50% by weight, preferably 35 to 45% by weight of U3 triglyceride (S: saturated fatty acid having 16 to 24 carbon atoms, U: unsaturated fatty acid having 16 to 18 carbon atoms) in all triglyceride compositions, and has 0.5≤P/St≤2.0 of weight ratio of C16 to C18, and SSU/SUS>1.

S3 means a triglyceride of which all constituent fatty acids are S, but it does not mean that all of S must consist only of saturated fatty acids having same chain length, and S may be in the range of 16 to 24 carbon atoms. The S3 content is necessary to 15 to 40% by weight, and is preferably 15 to 30% by weight in the fat composition of the present invention. When the S3 content is less than 15% by weight, the crystallization rate is reduced, and the obtained solid roux may not have sufficient heat resistance and hardness. In addition, the solidification speed is lowered in the cooling and solidification after the molding. When it is more than 40% by weight, the obtained solid roux becomes too hard and the melting speed in the mouth is deteriorated.

S2U means both a triglyceride of which 1,3-positions are S and 2-position is U (SUS) and a triglyceride of which 1,2-positions are S and 3-position is U (SSU). Preferably, a solid roux has appropriate hardness and snappiness at room temperature and rapidly melts at around 40° C. order to provide such properties, the S2U content is necessary to 10 to 30% by weight, and is preferably 15 to 25% by weight. When the S2U content is less than 10% by weight, the obtained solid roux becomes too soft at room temperature. When the S2U content is more than 30% by weight, the obtained solid roux becomes too hard at room temperature, and thereby, the solid roux is hard to snap and the workability is reduced.

SU2 means both a triglyceride of which 1-position is S and 2,3-positions are U (SUU) and a triglyceride of which 1,3-positions are U and 2-position is S (USU). The SU2 content is necessary to 10 to 25% by weight, and is preferably 13 to 20% by weight. When the SU2 content is less than 10% by weight, the obtained solid roux becomes too hard at room temperature, and thereby, the workability of the solid roux is reduced. When the SU2 content is more than 25% by weight, the obtained solid roux becomes too soft at room temperature, and thereby, the hardness and the heat resistance tend to be insufficient.

U3 means a triglyceride of which all constituent fatty acids are U, but it does not mean that all of U must consist only of unsaturated fatty acids having same chain length, and U may be in the range of 16 to 18 carbon atoms. The U3 content is necessary to 30 to 50% by weight, and is preferably 35 to 45% by weight in the fat composition of the present invention. When the U3 content is less than 30% by weight, the obtained solid roux becomes too hard at room temperature, and thereby, the workability of the solid roux is reduced. When the U3 content is more than 50% by weight, the obtained solid roux becomes too soft at room temperature, and thereby, the hardness and the heat resistance tend to be insufficient.

The weight ratio of C16 to C18, P/St, is necessary to 0.5 to 2. When P/St is less than 0.5 or more than 2, whitening of the surface of the solid roux like a mold growth during storage tend to occur.

SSU/SUS is necessary to more than 1. When SSU/SUS is 1 or less, demolding property after cooling and solidifying the solid roux is deteriorated and whitening of the surface of the solid roux like a mold growth during storage tend to occur.

Preferably, the fat composition for solid roux of the present invention contains less than 50% by weight, preferably less than 45% by weight of saturated fatty acid. An object of the saturated fatty acid content is less than 50% by weight in the present invention. When it is 50% by weight or more, it is not considered that the saturated fatty acid content is reduced.

Preferably, the fat composition for solid roux of the present invention contains less than 5% by weight, further preferably less than 3% by weight of trans fatty acid in the total constituent fatty acids. An object of the trans fatty acid content is less than 5% by weight in the present invention. When it is 5% by weight or more, it is not considered that the trans fatty acid content is reduced.

In the solid roux of the present invention, an adding amount of the fat composition for solid roux is not particularly limited, but preferably 25 to 70% by weight, and further preferably 30 to 60% by weight. When the adding amount of the solid fat composition of the present invention is less than 25% by weight, an appropriate viscosity cannot be given to a processed food using the solid roux, and a texture of the processed food sometimes lacks smoothness. When the adding amount of the fat composition for solid roux of the present invention is more than 70% by weight, a viscosity of processed food using the solid roux is decreased and the processed food is sometimes oily.

Further components that may be contained in the solid roux of the present invention include spice such as curry, cacao mass, cocoa powder, dairy products such as whole milk powder, skimmed milk powder, butter milk powder, whey powder, and yogurt powder, grain, pulse, vegetable, meat, seafood, fruit, fruit juice, coffee, nut paste, vegetable proteins such as wheat protein and soybean protein, egg and food product material such as various egg processed products, emulsifier, thickening stabilizer, saltiness agent such as salt and potassium chloride, acidulant such as acetic acid and lactic acid, sweetener such as saccharide and sugar alcohols, stevia, and aspartame, colorant such as 3-carotene and caramel, and antioxidant such as tocopherol and tea extract. These food product materials and food additives may be used solely or in combination of two or more kinds of them.

The solid roux of the present invention may be widely used for processed food such as various sauces such as curry, white sauce, hash source, and demiglace source, various stews such as curry stew, white stew, and demiglace stew, filling for bread, and topping.

EXAMPLES

Hereinafter, the effect of the present invention will be described in more detail by way of Examples and Comparative Examples. In the Examples, both of part and % mean weight basis.

Example 1

The mixture was prepared by mixing 80 parts of fully hydrogenated palm oil and 20 parts of high-oleic sunflower oil. The mixture was subjected to random interesterification using sodium methylate as a catalyst, and then washed with water, dehydrated and refined. Fat composition for solid roux 1 was obtained by mixing 50 parts of the obtained interesterified oil and 50 parts of high-oleic sunflower oil.

Example 2

The mixture was prepared by mixing 70 parts of fully hydrogenated palm oil and 30 parts of high-oleic sunflower oil. The mixture was subjected to random interesterification using sodium methylate as a catalyst, and then washed with water, dehydrated and refined. Fat composition for solid roux 2 was obtained by mixing 50 parts of the obtained interesterified oil and 50 parts of high-oleic sunflower oil.

Example 3

The mixture was prepared by mixing 75 parts of fully hydrogenated palm oil, 20 parts of high-oleic sunflower oil, and 5 parts of fully hydrogenated high-erucic rapeseed oil. The mixture was subjected to random interesterification using sodium methylate as a catalyst, and then washed with water, dehydrated and refined. Fat composition for solid roux 3 was obtained by mixing 50 parts of the obtained interesterified oil and 50 parts of high-oleic sunflower oil.

Comparative Example 1

The mixture was prepared by mixing 80 parts of fully hydrogenated rapeseed oil and 20 parts of high-oleic sunflower oil. The mixture was subjected to random interesterification using sodium methylate as a catalyst, and then washed with water, dehydrated and refined. Fat composition for solid roux 4 was obtained by mixing 50 parts of the obtained interesterified oil and 50 parts of high-oleic sunflower oil.

Comparative Example 2

The mixture was prepared by mixing 83.5 parts of palm hard stearin (iodine value: 12), 11.5 parts of high-oleic sunflower oil, and 5 parts of fully hydrogenated high-erucic rapeseed oil. The mixture was subjected to random interesterification using sodium methylate as a catalyst, and then washed with water, dehydrated and refined. Fat composition for solid roux 5 was obtained by mixing 50 parts of the obtained interesterified oil and 50 parts of high-oleic sunflower oil.

Comparative Example 3

Fat composition for solid roux 6 was obtained by mixing 40 parts of fully hydrogenated palm oil having 1 of iodine value and 58.5° C. of slip melting point and 60 parts of high-oleic sunflower oil.

Comparative Example 4

An interesterified oil was obtained by subjecting high-oleic sunflower oil and stearic acid to interesterification reaction with using 1,3-position-specific lipase, and then subjecting to a distillation. The interesterified oil was heated and melted at 60° C. and cooled to 31° C. with stirring to crystallization, and then press filtered to obtain high-melting point fraction as fractionated oil. Fat composition for solid roux 7 was obtained by mixing 65 parts of the obtained high-melting point fraction and 35 parts of high-oleic sunflower oil.

Comparative Example 5

An interesterified oil having 46° C. of melting point (manufactured by FUJI OIL CO., LTD., the product name "Parkid V") was used.

The compositions of each of fats are shown in table 1.

TABLE 1

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| S3 content % | 26.3 | 18.5 | 24.9 | 26.8 | 23.9 | 40.5 | 1.0 | 23.5 |
| S2U content % | 20.4 | 23.2 | 21.0 | 20.1 | 21.5 | 1.6 | 57.7 | 43.7 |

TABLE 1-continued

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| SU2 content % | 15.2 | 19.3 | 15.8 | 15.0 | 16.3 | 12.6 | 12.6 | 27.2 |
| U3 content % | 38.2 | 39.0 | 38.3 | 38.2 | 38.4 | 45.4 | 38.3 | 5.6 |
| P/S ratio | 0.86 | 0.97 | 0.83 | 0.06 | 11.9 | 0.59 | 0.12 | 8.06 |
| SSU/SUS ratio | 1.67 | 1.67 | 1.67 | 1.67 | 1.67 | 0.01 | 0.01 | 1.67 |
| Saturated fatty acid content % | 44.4 | 40.1 | 43.8 | 44.8 | 43.3 | 45.3 | 44.2 | 61.7 |
| Trans fatty acid content % | 0.1 | 0.1 | 0.1 | 0.1 | 0.1 | 0.1 | 0.1 | 1.0 |

<Formulation and Production Method of Solid Roux>

Flour roux was prepared by performing roasting treatment to 11 parts of flour and 36 parts of each fat. Then, 41 parts of the flour roux, 29 parts of curry powder, 13 parts of sugar, 9 parts of salt, 1.6 parts of sodium glutamate, and 0.4 part of lecithin were heated at 80° C. and mixed by a mixer. The obtained mixture was poured into a round aluminum foil container having 3 cm of diameter to 1 cm of thickness, and cooled at 20° C. and solidified to obtain a solid roux.

<Evaluation Method of Solid Roux>

(Heat Resistance Evaluation)

After a solid roux was left in a constant-temperature oven at 40° C. for 2 hours, presence/absence of attachment to a finger such that surfaces of the solid roux were touched by hand, presence/absence of oil-off, and presence/absence of deformation were confirmed.

⊙: Excellent (There is no attachment to the finger, oil-off, and deformation)

o: Good (Oil is slightly attached to finger, but there is no deformation)

Δ: Slightly poor (There are attachment to finger and oil-off, but no deformation)

×: Poor (There are much attachment to finger and oil-off, and deformation also occurs)

As an appearance evaluation after storing, presence/absence of occurrence of whitening at the surface of the solid roux was confirmed.

⊙: Excellent (There is no occurrence of whitening, and no change compared with before storing)

o: Good (There is no occurrence of whitening, but appearance is slightly different from that before storing)

Δ: Slightly poor (There is slightly whitening at surface of solid roux)

×: Poor (There is whitening at entire surface of solid roux)

(Hardness of Solid Roux at 20° C.)

After a solid roux was stored at 20° C. for 2 hours, a hardness (maximum load value) of the solid roux was measured by using a rheometer manufactured by Yamaden Co., Ltd. using plunger with 3 mm in diameter.

(Evaluation of Melting Speed in the Mouth of Curry Roux)

Curry roux containing 25% by weight of the above solid roux was prepared in the conventional method. A melting speed in the mouth of the curry roux was evaluated at a product temperature of 45° C.

⊙: Excellent o: Good

Δ: Slightly poor

×: Poor

TABLE 2

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Heat resistance at 40° C. | o | o | ⊙ | ⊙ | Δ | ⊙ | × | ⊙ |
| Whitening | ⊙ | ⊙ | ⊙ | Δ | Δ | o | × | ⊙ |
| Hardness of solid roux at 20° C. | 900 | 820 | 1100 | 520 | 470 | 1200 | 780 | 1000 |
| Melting speed in the mouth | ⊙ | ⊙ | ⊙ | Δ | ⊙ | × | ⊙ | o |

A solid roux obtained by using the fat composition for solid roux of Example 1, 2 or 3, having a triglyceride composition including 15 to 40% by weight of S3 triglyceride, 10 to 30% by weight of S2U triglyceride, 10 to 25% by weight of SU2 triglyceride, and 30 to 50% by weight of U3 triglyceride, and having 0.5≤P/St≤2.0 of weight ratio of C16 to C18, and SSU/SUS>1, showed excellent heat resistance at 40° C. and whitening resistance in spite of reduced saturated fatty acid content. And, it showed good enough hardness and excellent workability at the time of use. Curry roux obtained by using the solid roux showed excellent melting speed in the mouth.

Comparative Example 1 in which P/St ratio is less than 0.5 showed insufficient whitening resistance and melting speed in the mouth. Comparative Example 2 in which the ratio is more than 2 showed insufficient heat resistance and whitening resistance. In addition, Comparative Example 3 in which S2U triglyceride content was low and SSU/SUS was less than 1 showed remarkably poor melting speed in the mouth of the obtained curry roux. Comparative Example 4 in which S3 triglyceride content was less than 15% by weight, S2U triglyceride content was more than 30% by weight, and SSU/SUS was less than 1 showed excellent melting speed in the mouth of the obtained curry roux, but showed poor heat resistance at 40° C. and whitening resistance.

INDUSTRIAL APPLICABILITY

The present invention enables to provide a method for producing a solid roux having shape-retaining property in summer, resistance against seeping of the liquid oil component, resistance against the whitening of the surface, and good melting speed in the mouth, and reduction of contents of trans fatty acid and saturated fatty acid at the same time.

The invention claimed is:

1. A fat composition for a solid roux having a triglyceride composition comprising 15 to 40% by weight of S3 triglyceride, 10 to 30% by weight of S2U triglyceride, 10 to 25% by weight of SU2 triglyceride, and 30 to 50% by weight of U3 triglyceride (S: saturated fatty acid having 16 to 24 carbon atoms, U: unsaturated fatty acid having 16 to 18 carbon atoms), and having $0.5 \leq P/St \leq 2.0$ of weight ratio of C16 (P: palmitic acid) to C18 (St: stearic acid), and SSU/SUS>1.

2. The fat composition for a solid roux according to claim 1, having a triglyceride composition comprising 15 to 30% by weight of S3 triglyceride, 15 to 25% by weight of S2U triglyceride, 13 to 20% by weight of SU2 triglyceride, and 35 to 45% by weight of U3 triglyceride.

3. The fat composition for a solid roux according to claim 1, comprising less than 50% by weight of saturated fatty acid.

4. The fat composition for a solid roux according to claim 1, comprising less than 5% by weight of trans fatty acid in all constituent fatty acids.

5. A solid roux comprising a fat composition for a solid roux wherein the fat composition has a triglyceride composition comprising 15 to 40% by weight of S3 triglyceride, 10 to 30% by weight of S2U triglyceride, 10 to 25% by weight of SU2 triglyceride, and 30 to 50% by weight of U3 triglyceride (S: saturated fatty acid having 16 to 24 carbon atoms, U: unsaturated fatty acid having 16 to 18 carbon atoms), and having $0.5 \leq P/St \leq 2.0$ of weight ratio of C16 (P: palmitic acid) to C18 (St: stearic acid), and SSU/SUS>1.

6. A processed food comprising the solid roux according to claim 5.

7. The fat composition for a solid roux according to claim 2, comprising less than 50% by weight of saturated fatty acid.

8. The fat composition for a solid roux according to claim 2, comprising less than 5% by weight of trans fatty acid in all constituent fatty acids.

9. The fat composition for a solid roux according to claim 3, comprising less than 5% by weight of trans fatty acid in all constituent fatty acids.

10. The solid roux according to claim 5, wherein the fat composition has a triglyceride composition comprising 15 to 30% by weight of S3 triglyceride, 15 to 25% by weight of S2U triglyceride, 13 to 20% by weight of SU2 triglyceride, and 35 to 45% by weight of U3 triglyceride.

11. The solid roux according to claim 5, wherein the fat composition comprises less than 50% by weight of saturated fatty acid.

12. The solid roux according to claim 5, wherein the fat composition comprises less than 5% by weight of trans fatty acid in all constituent fatty acids.

13. The solid roux according to claim 10, wherein the fat composition comprises less than 50% by weight of saturated fatty acid.

14. The solid roux according to claim 13, wherein the fat composition comprises less than 5% by weight of trans fatty acid in all constituent fatty acids.

15. A processed food comprising the solid roux according to claim 14.

16. The fat composition for a solid roux according to claim 7, comprising less than 5% by weight of trans fatty acid in all constituent fatty acids.

* * * * *